No. 745,956. PATENTED DEC. 1, 1903.
F. B. CANNOCK.
MOVING PICTURE MECHANISM.
APPLICATION FILED MAR. 18, 1903.
NO MODEL. 4 SHEETS—SHEET 1.
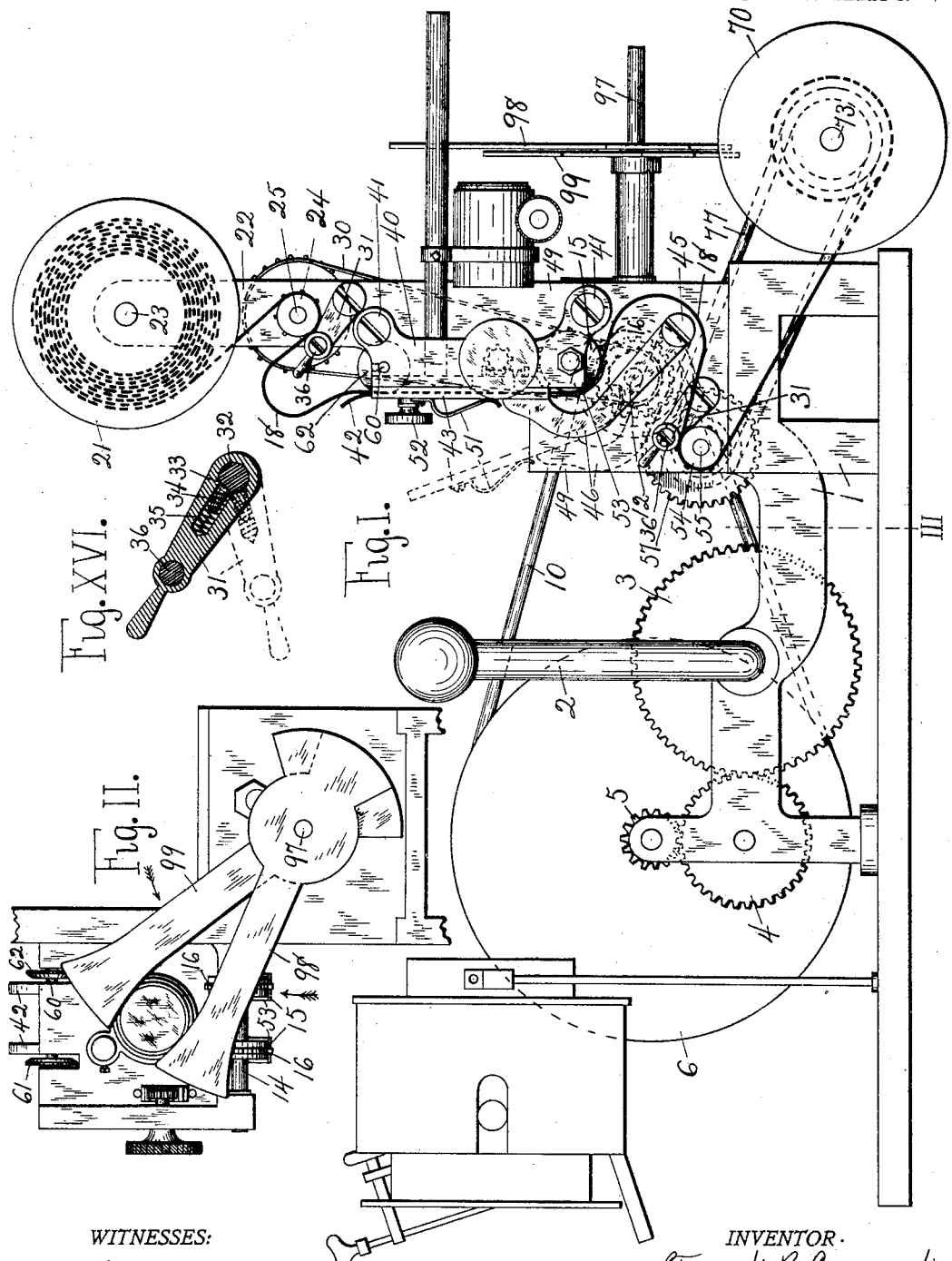
WITNESSES:
INVENTOR·
Frank B Cannock
BY
Alfred Wilkinson
ATTORNEY.

No. 745,956. PATENTED DEC. 1, 1903.
F. B. CANNOCK.
MOVING PICTURE MECHANISM.
APPLICATION FILED MAR. 18, 1903.
NO MODEL. 4 SHEETS—SHEET 2.
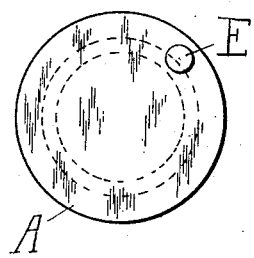
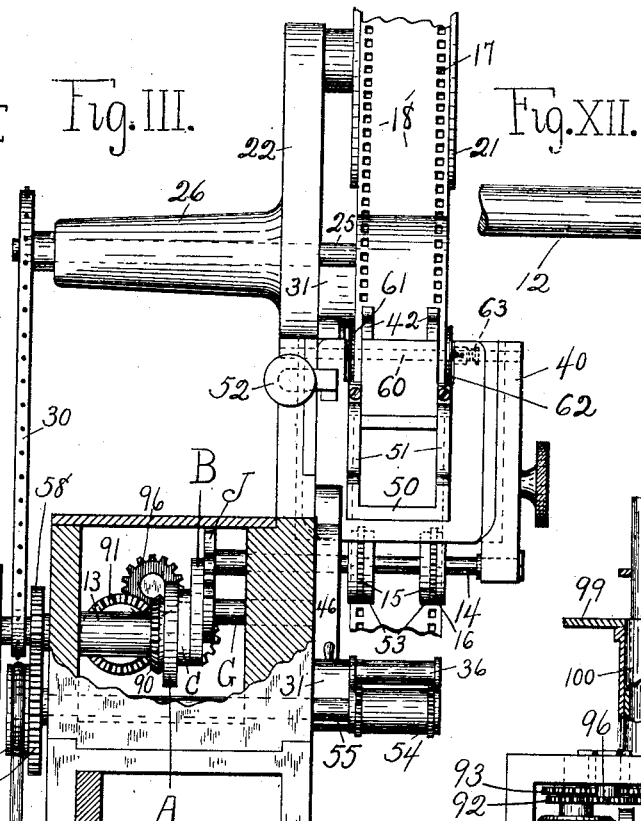
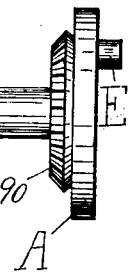
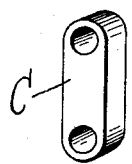
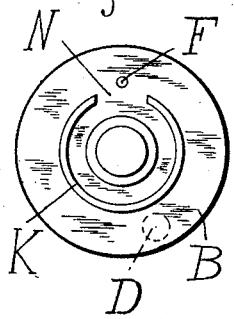
WITNESSES:
CC Schorneck
Robert O Hus
INVENTOR
Frank B Cannock
BY
Alfred Wilkinson
ATTORNEY No. 745,956. PATENTED DEC. 1, 1903.
F. B. CANNOCK.
MOVING PICTURE MECHANISM.
APPLICATION FILED MAR. 18, 1903.
NO MODEL. 4 SHEETS—SHEET 3.
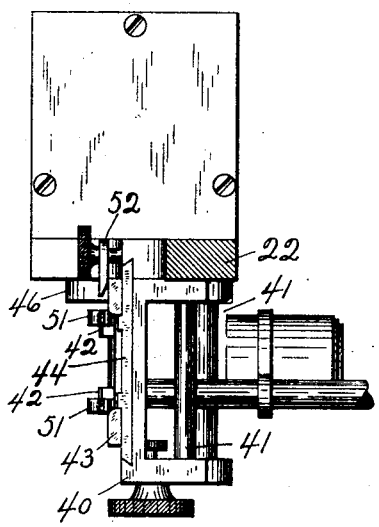
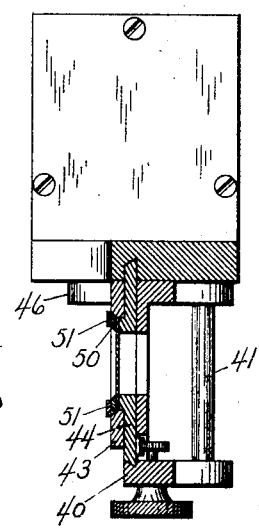
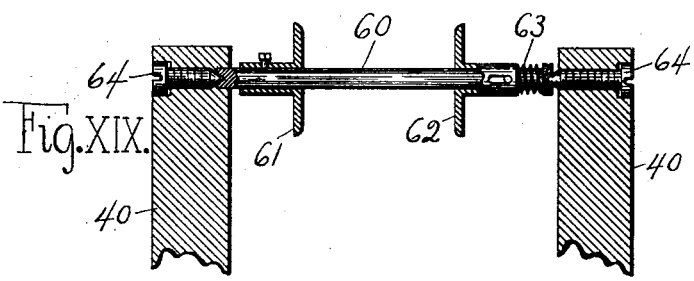
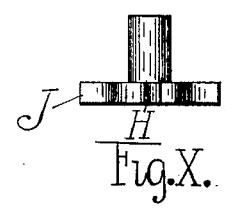
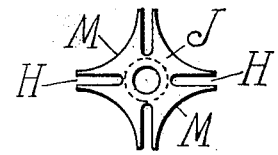
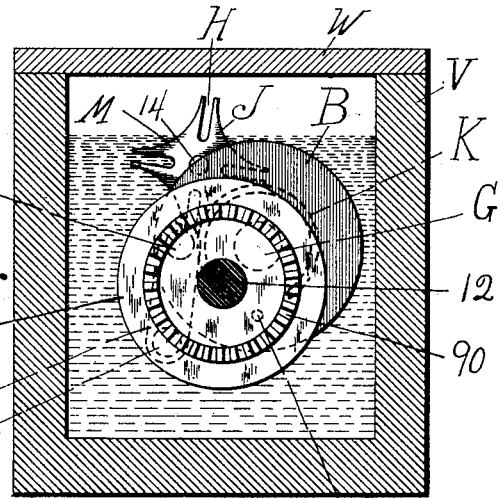
WITNESSES:
INVENTOR
Frank B Cannock
BY
Alfred Wilkinson
ATTORNEY.

No. 745,956. PATENTED DEC. 1, 1903.
F. B. CANNOCK.
MOVING PICTURE MECHANISM.
APPLICATION FILED MAR. 18, 1903.
NO MODEL. 4 SHEETS—SHEET 4.
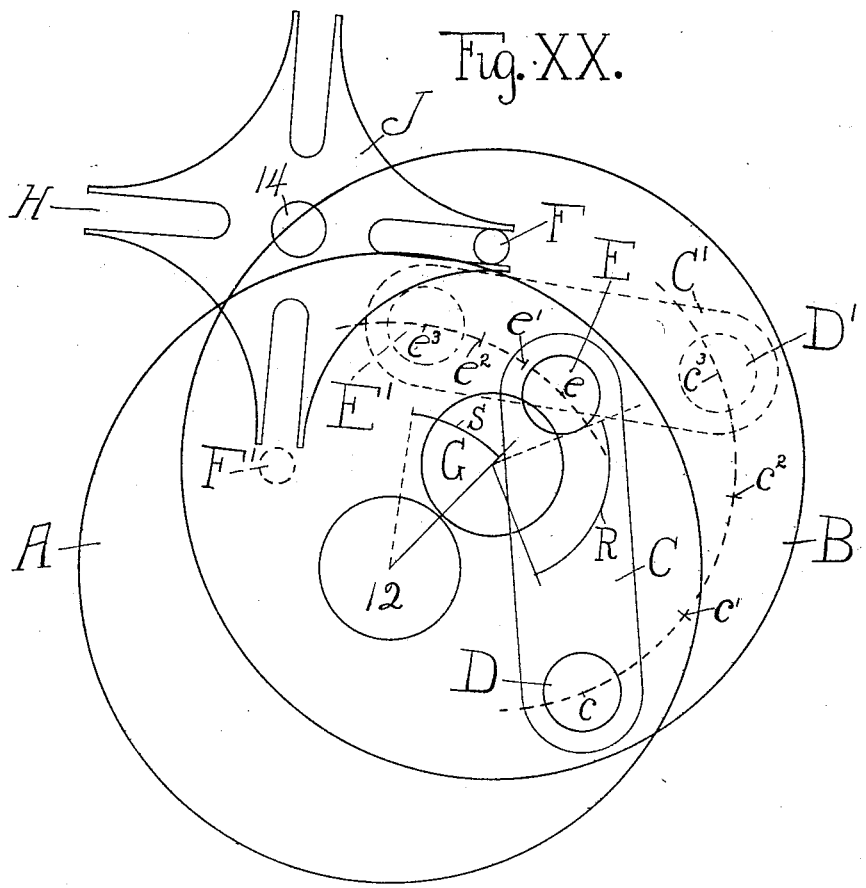
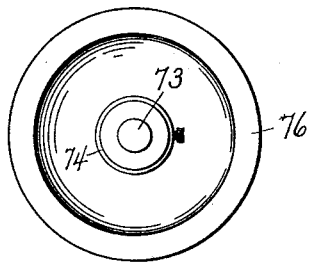
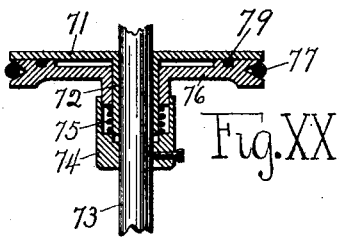
WITNESSES:
INVENTOR
Frank B Cannock
BY Alfred Wilkinson
ATTORNEY.

No. 745,956. Patented December 1, 1903.

UNITED STATES PATENT OFFICE.

FRANK B. CANNOCK, OF ANNADALE, NEW YORK, ASSIGNOR OF ONE-HALF TO RICHARD G. HOLLAMAN, OF BROOKLYN, NEW YORK.

MOVING-PICTURE MECHANISM.

SPECIFICATION forming part of Letters Patent No. 745,956, dated December 1, 1903.

Application filed March 18, 1903. Serial No. 148,303. (No model.)

*To all whom it may concern:*

Be it known that I, FRANK B. CANNOCK, a citizen of the United States, residing at Annadale, Staten Island, in the county of Richmond and State of New York, have invented certain new and useful Improvements in Moving-Picture Mechanism; and I do hereby declare the following to be a full, clear, and exact description of the invention, such as will enable others skilled in the art to which it appertains to make and use the same.

My invention relates to a so-called "kinematograph," or machine for projecting on a screen a series of small photographs taken on a continuous film of celluloid or other transparent material, so as to give a representation of scenes substantially as they occur and to reproduce in a life-like manner the movements of the people and other moving bodies.

The invention consists in a mechanism operating on a new principle and in other new features and elements used therewith, besides in various details of construction.

My invention is shown in the drawings, in which the reference letters and numerals of the specification indicate the corresponding parts in all the figures.

Figure I is a side elevation of my complete machine. Fig. II is a front elevation of the machine with portions broken away, showing the shutters in operative position. Fig. III is a rear elevation on line III of Fig. I with portions of the case broken away. Fig. IV is a top plan of the gear-case with the cover removed. Figs. V and VI are vertical cross-sections of the gear-case, showing the crank-disks respectively at their shortest and longest stroke. Fig. VII is a top plan of the film-trap and adjacent parts. Fig. VIII is a horizontal cross-section of the preceding. Figs. IX and X are respectively plan and elevation of the star-wheel. Figs. XI and XII are respectively front and side elevation of the disk on the main shaft. Figs. XIII and XIV are respectively front and side elevation of the disk on the crank-shaft. Fig. XV is an isometric view of the connecting-link. Fig. XVI is a longitudinal section of one of the arms for holding the antifriction-rollers up against the film. Figs. XVII and XVIII are respectively elevation and plan of the frame fitted to the film-trap door. Fig. XIX is a section of the film-guiding mechanism. Fig. XX is a diagram illustrating my new mechanical movement, by which a varying speed of rotation is communicated from one shaft to another. Figs. XXI and XXII are respectively elevation and cross-section of a rewinding-clutch.

In the figures, 1 indicates the base, suitably formed of cast metal or otherwise, in which is journaled the operating-handle 2, turned by any suitable motor, but preferably by hand, to which is connected the first gear 3, meshing with gear 4, suitably journaled, in turn meshing with gear 5, also suitably journaled, which drives pulley 6, whence the belt 10 operates the main pulley 11 on main shaft 12, fitted to bushing 13. The size of these various gears and the pulley are so proportioned that by moderate speed in the rotation of the handle the sprockets and other parts by which the film is fed are operated at a sufficient rate of speed. Between the main shaft 12 and the sprocket-shaft 14 is arranged an intermediate mechanism operating on a new principle, by which the regular speed of rotation of the main shaft is converted into a variable speed of rotation of the sprocket-shaft. The sprocket-shaft carries the sprocket-wheels 15, formed with teeth 16, engaging in perforations 17 in the edges of the film 18. The film, photographed with the successive pictures of the scene to be exhibited, is coiled on reel 21, journaled on shaft 23 on reel-arms 22, whence it passes over the upper feed-sprocket 24. Preferably this upper feed-sprocket on shaft 25 is smaller and provided with fewer teeth than sprocket 15—for instance, three-quarters the number of teeth—so that when the film shrinks, which oftens happens, a shorter portion thereof is engaged by the teeth of the upper sprocket, whereby there is less variation in the length of the amount of film on this sprocket and less danger of the teeth not registering with the perforations. Sprocket 24 is secured on shaft 25, journaled in bushing 26, and driven by belt 30 from the main shaft 12 or suitable sprocket thereon.

31 is a roller-arm suitably journaled on pin 32, having a flattened portion 33, with which engages the little plunger 34, fitted to a socket in the arm and held against the shaft by spiral spring 35, whereby the antifriction-roller 36 is held up in position against the film with sufficient firmness to maintain it in engagement with the sprocket 25. This arrangement of roller-arm and roller is best shown in Figs. I and XVI. It is also used to hold the film against lower sprocket 54.

40 is the outside plate, secured in position on the main plate 49 by studs 41, between which is journaled shaft 14 and sprockets 15.

The film 18 extends from the reel over sprocket 24 and thence in an upper loop under the guard-springs 42 not in contact with the film, but to prevent its flying backward out of position, which are secured to the inside of the door 43 of the film-trap, of which 44 is the back plate. The door is carried on supporting-arms 46, journaled to swing on center 45.

50 is an independent frame having beveled sides and provided with tapering edges fitted to a corresponding opening in the door to exert a slight but sufficient pressure on the margins of the film to keep the picture that is being projected flat, so that it can be perfectly focused. This frame is made independent of the door and merely large enough to keep the projected picture flat without friction on an unnecessary extent of margin. It is cut away above and below, not to make contact with the face of the film.

52 is a door-lock of any suitable construction, such as a thumb-screw and clamp, to engage with the door and hold it in closed position.

53 represents lower guide-springs holding the film in engagement with the teeth of the main sprockets, whence it passes in the lower loop to the lower sprocket 54 on shaft 55, driven by gear 57, engaging with gear 58 on the main shaft. This sprocket 54 is also preferably smaller than sprockets 15 for the same reason as sprocket 24. The film is also held in position by guide-disks engaging with its edges, which are arranged substantially as shown in Fig. XIX. The inner disk 61 may be secured on shaft 60, suitably journaled between the pointed adjusting-screws 64. The outer, 62, fitted to slide freely on said shaft, is held with sufficient firmness in engagement with the edge of the film by spring 63. Pin on shaft engaging with slot in disk limits its movement. This mechanism is important, its chief function being to exert a slight but sufficient edge pressure on the film to prevent joggling, unsteadiness, and lateral motion thereof and to compensate for slight variations in the width of the film. It is easily adjusted to films of different widths, as they are made in different countries. Said "disks" may be made of any suitable form, their essential features being that they shall be adjustably arranged on the shaft so as to revolve and continually exert a slight edge pressure on the film.

From the lower sprocket the film extends over the rewinding-reel 70, which is rotated by a friction-clutch of simple construction, (shown in Figs. XXI and XXII,) which slips as more film is rewound, and thus adapts its speed to the amount of film carried thereon. The inner plate 71 of the rewinding-clutch is provided with hub 72, by which it is secured on the rewind-shaft 73, to which is also secured by set-screw the hollow sleeve 74, within which is arranged a spring 75, coiled around said hub and bearing against the grooved pulley 76, operated by belt 77 from pulley 78 on shaft 55. Pulley 76 is provided with a friction-ring 79, of rubber, leather, soft metal, or other suitable material, to engage with the inner plate of the reel. By this construction a sufficient friction is exerted on this reel to rewind the film after projection, the spring exerting a sufficient but slight pressure so that as the amount of film wound is increased the parts will slip, so as to diminish the speed of rewinding proportionately. This rewinding-reel is important for reasons of convenience, but particularly because it has been common heretofore to let the film after projection drop into a box, with great danger of fire when lying thus loosely, whereas in my mechanism it is coiled onto the second reel convenient for rewinding and reversing onto the first without any danger of fire or explosion, even if a spark or hot particle comes in contact with it.

The film must be moved rapidly in order to produce on the eye of the spectator the impression of movement of the people, &c., in the scenes exhibited; but in order to produce this effect, though the operation of feeding must be very rapid, it is necessary that the film should momentarily remain stationary during the projection on the screen; otherwise there would be an indistinguishable blur, and for ten years and more it has been well understood that the time of shifting the film— that is, its movement between one position and the next—should be made as short as possible and the time in which each photograph is exposed to view should be as long as possible to produce a distinct impression on the eye. For instance, if the film is moved at a speed to project twenty photographs per second it is desirable that each change occupy only one one-hundredth of a second, thus leaving four one-hundredths of a second to each photograph during which it may remain stationary for projection. To reduce the time of change to the shortest, I have devised a mechanism operating, so far as I am aware, on a new mechanical principle, by which one part rotating at a constant and regular rate of speed may rotate another part at a variable rate of speed, so that the second part during a portion of each rotation may move faster than the first part.

A convenient mode of embodying my mechanism in practical form is here shown, in which the rotating parts are shafts, of which the main or positive shaft is connected to the second or counter shaft through a link hinged to a crank secured on each shaft. For purposes of convenience these shaft-cranks are made in the form of disks, of which A is the first disk, secured on main shaft 12, and B is the second disk, secured on counter-shaft G. The shafts are arranged eccentrically and preferably parallel and are connected by the link C, fitted to turn freely on both studs D E, so that the first or main shaft, turned by suitable power, rotates the second shaft. On second crank or disk B is a pin F, arranged to engage at each rotation with a notch H on the edge of the star-wheel J, fixed on sprocket-shaft 14, whereby the sprockets 15 are rotated step by step and the film is fed. By each rotation of the counter-shaft the star-wheel is turned one space, which may be through any suitable angle, (as here shown ninety degrees,) the star-wheel being formed with four marginal notches, and the parts are so arranged and proportioned that this feeds the film step by step the proper distance to move one picture out of the field and the next into the field, where it rests during the remainder of the rotation of the shaft G, when on the next rotation the pin F engages with the next notch of the star-wheel, which is moved another step and the film is again fed the proper distance. On the inner face of disk B is a rib K, fitting the concave portions M on the star-wheel between the notches to maintain the position of the star-wheel to prevent rotation during the quarter-turns. This rib is cut away at N opposite pin F to receive the ends of the star-wheel teeth.

The diagram Fig. XX shows how during a portion of its rotation the disk B is moved faster than the disk A. In order to move the pin F to position F' through the angle or arc of ninety degrees necessary to turn the star-wheel one space, it is evident that all parts of disk B must also move through an arc of ninety degrees and the stud D through angle R ninety degrees to the position D', its path being indicated by line $c\ c'\ c^2\ c^3$. As this movement of disk B is produced by the link connected to the two studs D and E, it will be evident that the movement of stud E necessary to produce this movement of ninety degrees of stud D will be found by laying off on the path of stud E $e\ e'\ e^2\ e^3$ the length of the link from the position D', which will bring stud E into position E' with its center at $e^3$, a movement of forty degrees, or thereabout. Therefore with the parts arranged in this position it will be seen that while stud E, moving at a regular rate of speed, moves through an arc of about forty degrees it will in the same time move the stud D through the arc of ninety degrees necessary to turn the star-wheel one space, so that during this time the movement of the film is greatly accelerated. The position of the parts at the begining of this accelerated movement is shown in Fig. V and at the end thereof is shown in Fig. VI, immediately after which the shafts first rotate at the same rate of speed, and then while the picture is stationary the disk B moves more slowly than the disk A during a portion of the rotation, thus compensating for the more rapid rotation of disk B, as described, during the active time of rotation. This mechanism is preferably inclosed in box V, filled with lubricating liquid, having removable cover W.

*Double shutter.*—Heretofore it has been common to use a single shutter adapted to cut off the light at the instant of the feed of the film, which tends to do away with the so-called "ghost" or "rain" effect produced in cases of extreme contrast between light and dark pictures or light and dark parts. I have devised a double shutter, the two blades of which rotate in opposite directions and are timed to meet and cross in the center of the lens at the instant of change to avoid this "ghost" effect. Where a single shutter is used, it cuts across the field from one side to the other and a larger shutter is necessary, whereas by the use of two narrow shutters turning in opposite directions they move across the field from sides to center more quickly, cutting off the light from sides to center and for a shorter time. On the main shaft is secured the miter-gear 90, meshing with miter-gear 91, fixed on stud 89, suitably journaled and carrying on its front end the spur-gear 92, meshing with intermediate gear 96, which meshes with pinion 94 on shaft 97, carrying shutter 98. On stud 89 is also keyed the larger spur-gear 93, meshing with a corresponding pinion 95, fixed on tubular shaft 100, (in tubular bearing 101,) which carries and turns in the opposite direction the other shutter 99. By the proportion and arrangement of these pairs of gears and pinions of the same pitch the shutters, respectively, on shafts 97 and 100 are rotated at the same rate of speed, but in opposite directions, so as to cut across the lens from edge to center, being timed, as aforesaid, to cut off the view at the instant of the film-feed, but instantaneously only.

By my mechanism the shift is made and the center of each picture very quickly brought into fixed position for projecting and the picture projected in this position as long as possible. The two narrow shutters are particularly useful with my accelerated movement, for they cut off the light for the briefest time. I do not limit myself to the mechanical construction and arrangement of my parts here shown, for they may be varied.

Having thus described my invention, what I claim as new, and desire to secure by Letters Patent, is—

1. In a moving-picture mechanism, the combination with a suitable frame and a reel for holding the film, of a main sprocket-shaft journaled in the frame, main sprockets thereon to engage with perforations in the margin of the film, an upper shaft above the main sprocket-shaft and parallel thereto, upper feed-sprockets on the upper shaft to engage with perforations in the margin of the film, a lower shaft arranged below the main sprocket-shaft and parallel thereto, lower feed-sprockets on the lower feed-shaft, and means to rotate said sprocket-shafts and sprockets to feed the film, said upper and lower sprockets being smaller in diameter and having fewer teeth than the main sprockets.

2. In a moving-picture mechanism, the combination with a suitable frame and a reel for holding the film, of a main sprocket-shaft journaled in the frame, main sprockets thereon engaging with perforations in the margin of the film, an upper shaft parallel to the main sprocket-shaft, upper feed-sprockets on the upper shaft to engage with perforations in the margin of the film, a lower shaft arranged below the main sprocket-shaft and parallel thereto, lower feed-sprockets on the lower feed-shaft, means to rotate said sprocket-shafts and sprockets to feed the film, said upper and lower sprockets being smaller in diameter and having fewer teeth than the main sprockets, roller-arms pivotally supported adjacent to said upper and lower sprockets to engage with the film and to hold it in engagement with the sprocket-teeth.

3. In a moving-picture mechanism, feed-sprockets having teeth to engage with perforations in the margin of the film, means to support said sprockets and to rotate them to feed the film, roller-arm pins suitably supported adjacent to said sprockets and having flattened portions, roller-arms pivotally supported on said pins, antifriction-rollers on the outer edges of said arms adapted to be swung into or out of engagement with the film as the roller-arms are turned, and plungers and springs fitted to sockets formed in the interior of said roller-arms, whereby the plungers are forced against the pins to hold the rollers in or out of position.

4. In a moving-picture mechanism, means to shift the film quickly, having in combination a main shaft, a counter-shaft arranged eccentrically to the main shaft, corresponding disks on said shafts arranged parallel, studs on said disks, a link pivotally fitted to said studs, means to rotate the main shaft, sprockets suitably journaled engaging with the film, and a connection between the counter-shaft and said sprockets, whereby the counter-shaft is rotated faster than the main shaft during a portion of its rotation and a quick step-by-step feed of the film is effected.

5. In a moving-picture mechanism, means to support the film, a sprocket-shaft, sprockets thereon engaging with the film, a star-wheel having marginal notches, a main shaft, a counter-shaft arranged eccentrically to the main shaft, parallel disks fixed on said main and counter shafts, a link connection pivotally connected to both disks, means to rotate the main shaft, and a pin on the counter-shaft disk to engage with a star-wheel notch at each rotation during the time of accelerated rotation of said counter-shaft disk.

6. In a moving-picture mechanism, means to support the film, a sprocket-shaft, sprockets thereon to engage with the film, a star-wheel on the sprocket-shaft having marginal notches and concave arc depressions between the notches, a main shaft, a counter-shaft arranged eccentrically, disks on said main and counter shafts arranged parallel, a connection between said disks freely pivoted to each, a pin on the counter-shaft disk to engage with the star-wheel notches, and a circular rib on the counter-shaft disk cut away opposite the pin and fitting the concave depressions on the star-wheel.

7. In a moving-picture mechanism, a tubular shutter-shaft, a solid shutter-shaft arranged in the tubular shaft, two narrow shutters respectively connected one to each shaft, a larger pinion on the tubular shaft, a smaller pinion on the solid shaft, a main shaft, a miter-gear on the main shaft, a stud suitably journaled adjacent thereto, a miter-gear on the stud engaging with the first miter-gear, a larger spur-gear on the stud meshing with the larger pinion, a smaller spur-gear on the stud, an intermediate gear suitably journaled and meshing with the smaller spur-gear and the smaller pinion, and suitable means for supporting the parts and rotating the main shaft.

8. In a moving-picture mechanism, a tubular shutter-shaft, a solid shaft arranged in the tubular shaft, two narrow shutters fitted to said respective shafts, a larger pinion on the tubular shaft, a smaller pinion on the solid shaft, a main shaft arranged at right angles to said shafts, a miter-gear on the main shaft, a stud suitably journaled parallel to the tubular shaft, a miter-gear on the stud engaging with the first miter-gear, a larger spur-gear on the stud meshing with the larger pinion, a smaller spur-gear on the stud, an intermediate gear suitably journaled meshing with the smaller spur-gear and the smaller pinion, a suitable box for supporting the parts and inclosing said gears and pinions in a lubricating liquid, and means to rotate the main shaft.

9. In a moving-picture mechanism, means for supporting and feeding the film, and in combination therewith two rotating elements and means to force them together to engage with the edge of the film as it is fed.

10. In a moving-picture mechanism, means for supporting and feeding the film, and means to exert a slight edge tension on the film, having in combination a rotating shaft adjacent to the film and parallel thereto, a disk fixed on said shaft, a second disk fitted to said shaft and free to slide thereon, and a spring to force the second disk toward the first to exert an edge pressure on the film.

11. In a moving-picture mechanism, means for supporting and feeding the film and means to exert a slight edge pressure on the film as it is fed, having in combination a suitable supporting-frame, oppositely-arranged pointed screws arranged therein, a shaft journaled between said screws across the film, a disk adjustably fixed on said shaft near one end, a second parallel disk fitted to the shaft near the other end and free to slide thereon, a pin on the shaft engaging with a slot in the second disk to limit its movement, and a spiral spring arranged around the shaft between a projection on its end and the second disk, to force said second disk toward the first to engage with the film edges.

12. In a moving-picture mechanism, a rewinding-reel to receive the film after projection, a shaft for said reel, a friction-clutch arranged on said shaft, one element fixed on the shaft, the other fitted to turn freely thereon, a spring to force the second element against the first and means to rotate the second element.

13. In a moving-picture mechanism, a rewinding-reel to receive the film after projection, a shaft for said reel, a friction-clutch having two plates arranged on said shaft the inner plate being fixed on the shaft and having an outwardly-extending hub, the outer plate fitted to turn on said hub, a friction-ring on one plate to engage with the other, a hollow sleeve fixed on the shaft and a spring arranged between said sleeve and outer plate.

14. In a moving-picture mechanism, means to feed the film having in combination a main shaft, a counter-shaft arranged eccentrically to the main shaft, a connection between said shafts freely connected to both, means to rotate the main shaft, sprockets supported to turn freely and adapted to engage with the film and a connection between the counter-shaft and the sprockets.

15. In a moving-picture mechanism, means to feed the film having in combination a main shaft, a counter-shaft arranged eccentrically to the main shaft, corresponding parallel cranks secured on the respective shafts, a connection between said cranks freely connecting both, means to rotate the main shaft, sprockets suitably journaled engaging with the film and a connection between the counter-shaft and the sprockets whereby the sprockets are rotated by the rotation of the counter-shaft.

16. In a moving-picture mechanism, means to feed the film having in combination a main shaft, a counter-shaft arranged parallel and eccentrically thereto, corresponding cranks arranged respectively on said shafts, a link pivotally connected to both cranks at equal distances from their respective centers, means to rotate the main shaft, sprockets suitably journaled and engaging with the film, and a connection between the counter-shaft and sprockets whereby the sprockets are rotated from the counter-shaft.

17. In a moving-picture mechanism, means to feed the film, having in combination a main shaft, a counter-shaft arranged eccentrically to the main shaft, a connection between said shafts freely connected to both, means to rotate the main shaft, a mechanism engaging with the film, an operative connection between the counter-shaft and said mechanism, and means to rotate the main shaft.

18. In a moving-picture mechanism, means for supporting and feeding the film, and means to exert a slight edge tension on the film, having in combination a supporting-shaft arranged across the film and adjacent and parallel thereto, an element fixed on the shaft and engaging with one edge of the film, a second element fitted to the shaft and free to move longitudinally thereon to engage with the other edge of the film, and a spring to force the second element toward the first.

19. In a moving-picture mechanism, means for supporting and feeding the film, and means to exert a slight edge tension on the film as it is fed, having in combination a shaft so supported adjacent to the film as to be free to rotate, an element fixed on the shaft to engage with one edge of the film as it is fed, a second element fitted to the shaft and free to slide thereon to engage with the opposite edge of the film, and a spring to force the second element toward the first.

20. In a moving-picture mechanism, means for supporting and feeding the film, and means to exert a slight edge tension on the film, having in combination a shaft so supported adjacent to the film as to be free to rotate, two disks fixed on the shaft to engage with the opposite edges of the film and having their inner edges inwardly beveled, one of said disks being free to slide on the shaft, the range of such longitudinal movement being such that the distance between the disks may vary from a little less than the width of the film to a little more than the width of the film, and a spring engaging with the sliding disk to force it toward the first.

In testimony whereof I affix my signature in presence of two witnesses.

FRANK B. CANNOCK.

Witnesses:
C. J. WILKINSON,
C. C. SCHOENECK.